United States Patent
Flehmig et al.

(10) Patent No.: US 9,428,219 B2
(45) Date of Patent: Aug. 30, 2016

(54) METHOD AND DEVICE FOR ASSISTING A DRIVER OF A VEHICLE IN A BOTTLENECK

(71) Applicants: Folko Flehmig, Stuttgart (DE); Yuefeng Ma, Ilsfeld (DE)

(72) Inventors: Folko Flehmig, Stuttgart (DE); Yuefeng Ma, Ilsfeld (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/323,230

(22) Filed: Jul. 3, 2014

(65) Prior Publication Data
US 2015/0012182 A1 Jan. 8, 2015

(30) Foreign Application Priority Data
Jul. 5, 2013 (DE) .......................... 10 2013 213 216

(51) Int. Cl.
| | |
|---|---|
| G06F 7/00 | (2006.01) |
| G06F 17/00 | (2006.01) |
| G06F 19/00 | (2011.01) |
| B62D 6/00 | (2006.01) |
| G05D 1/02 | (2006.01) |
| B62D 15/02 | (2006.01) |
| B62D 7/15 | (2006.01) |

(52) U.S. Cl.
CPC ............. *B62D 6/002* (2013.01); *B62D 15/025* (2013.01); *B62D 15/0265* (2013.01); *G05D 1/021* (2013.01); *B62D 7/159* (2013.01)

(58) Field of Classification Search
USPC ........ 701/36, 41–42, 301; 180/41, 443, 446, 180/422
See application file for complete search history.

(56) References Cited

U.S. PATENT DOCUMENTS 4,301,739 A * 11/1981 Mehren ................... B62D 1/265
  104/119
4,837,692 A * 6/1989 Shimizu ........................ 701/41
(Continued)

FOREIGN PATENT DOCUMENTS

DE 10 2011 082 475 3/2013
EP 1442948 A2 * 8/2004 ........... B60R 25/021

OTHER PUBLICATIONS

Lateral guidance of an autonomous vehicle by a fuzzy logic controller; Zalila, Z. ; Bonnay, F. ; Coffin, F; Systems, Man, and Cybernetics, 1998. 1998 IEEE International Conference on; vol. 2; DOI: 10.1109/ICSMC.1998.728190; Publication Year: 1998, pp. 1996-2001 vol. 2.*

(Continued)

*Primary Examiner* — Cuong H Nguyen
(74) *Attorney, Agent, or Firm* — Norton Rose Fulbright US LLP

(57) ABSTRACT

A method for assisting a vehicle driver in a bottleneck, including the tasks of reading in, evaluating, and providing. In the reading in, a piece of information about a negotiable corridor in the bottleneck, a piece of information about an instantaneous trajectory of the vehicle in the bottleneck, and a piece of information about a steering torque which is presently applied by the driver to a steering of the vehicle are read in. In the evaluating, the pieces of information about the corridor, the trajectory, and the steering torque are evaluated by using known dimensions of the vehicle to recognize an anticipated violation of the corridor by at least one part of the vehicle. In the providing, a control signal is provided for a counter torque which acts against the steering torque when the violation is recognized to assist the driver with avoiding the violation.

9 Claims, 3 Drawing Sheets

(56) References Cited

U.S. PATENT DOCUMENTS

| | | | |
|---|---|---|---|
| 5,020,616 A * | 6/1991 | Yagi et al. | 180/444 |
| 5,446,657 A * | 8/1995 | Ikeda et al. | 701/41 |
| 5,536,028 A * | 7/1996 | Howard | B62D 6/04 138/30 |
| 6,267,395 B1 * | 7/2001 | Howard | B62D 6/04 280/89.11 |
| 7,748,488 B2 * | 7/2010 | Tarasinski et al. | 180/242 |
| 8,086,406 B2 * | 12/2011 | Ewerhart et al. | 701/301 |
| 8,532,876 B2 * | 9/2013 | Igarashi et al. | 701/41 |
| 8,903,608 B2 * | 12/2014 | Niemz et al. | 701/41 |
| 2004/0155767 A1 * | 8/2004 | Hankins | B60Q 1/40 340/476 |
| 2011/0196576 A1 * | 8/2011 | Stahlin | B62D 6/003 701/42 |
| 2011/0264329 A1 * | 10/2011 | Limpibunterng | B62D 5/008 701/41 |
| 2012/0232758 A1 * | 9/2012 | Mercier | 701/41 |
| 2013/0253767 A1 * | 9/2013 | Lee | B60W 50/04 701/42 |

OTHER PUBLICATIONS

A Conjugate Gradient-Based BPTT—Like Optimal Control Algorithm With Vehicle Dynamics Control Application; Kasac, J.; Deur, J.; Novakovic, B.; Kolmanovsky, I.V.; Assadian, F.; Control Systems Technology, IEEE Transactions on; vol. 19, Issue: 6 DOI: 10.1109/TCST.2010.2084088; Publication Year: 2011, pp. 1587-1595.*

Optimal emergency maneuvers on highways for passenger vehicles with two- and four-wheel active steering; Dingle, P.; Guzzella, L.; American Control Conference (ACC), 2010; DOI: 10.1109/ACC.2010.5530760; Publication Year: 2010, pp. 5374-5381.*

Driver-vehicle closed-loop simulation of differential drive assist steering control system for motorized-wheel electric vehicle; Qingnian Wang; Junnian Wang; Liqiang Jin; Vehicle Power and Propulsion Conference, 2009. VPPC '09. IEEE DOI: 10.1109/VPPC.2009.5289799; Publication Year: 2009, pp. 564-571.*

Vehicle dynamics control based on sliding mode control technology; Siqi Zhang; Shuwen Zhou; Jun Sun; Control and Decision Conference, 2009. CCDC '09. Chinese; DOI: 10.1109/CCDC.2009.5192610; Publication Year: 2009, pp. 2435-2439.*

Shared control for road departure prevention; Katzourakis, D.; Alirezaei, M.; de Winter, J.C.F.; Corno, M.; Happee, R.; Ghaffari, A.; Kazemi, R.; Systems, Man, and Cybernetics (SMC), 2011 IEEE International Conference on; DOI: 10.1109/ICSMC.2011.6083811; Publication Year: 2011, pp. 1037-1043.*

Virtual Prototyping of an Electric Power Steering Simulator; Nehaoua, L.; Djemai, M.; Pudlo, P.; Intelligent Transportation Systems, IEEE Transactions on; vol. 14, Issue: 1; DOI: 10.1109/TITS.2012.2211352; Publication Year: 2013, pp. 274-283.*

New paradigms for the integration of yaw stability and rollover prevention functions in vehicle stability control; Rajamani, R.; Piyabongkarn, D.; Decision and Control (CDC), 2012 IEEE 51st Annual Conference on; DOI: 10.1109/CDC.2012.6426659 Publication Year: 2012, pp. 5046-5051.*

A portable driving simulator for single-track vehicles; Massaro, M.; Cossalter, V.; Lot, R.; Rota, S.; Ferrari, M.; Sartori, R.; Formentini, M.; Mechatronics (ICM), 2013 IEEE International Conference on; DOI: 10.1109/ICMECH.2013.6518564 Publication Year: 2013, pp. 364-369.*

Direct and Indirect Haptic Aiding for Curve Negotiation; Profumo, L.; Pollini, L.; Abbink, D.A.; mSystems, Man, and Cybernetics (SMC), 2013 IEEE International Conference on; DOI: 10.1109/SMC.2013.318; Publication Year: 2013, pp. 1846-1852.*

Design of a two DOF gain scheduled frequency shaped LQ controller for Narrow Tilting Vehicles; L. Mourad; F. Claveau; P. Chevrel; 2012 American Control Conference (ACC); Year: 2012; pp. 6739-6744, DOI: 10.1109/ACC.2012.6315042.*

Shared control for road departure prevention; D. Katzourakis; M. Alirezaei; J. C. F. de Winter; M. Corno; R. Happee; A. Ghaffari; R. Kazemi; Systems, Man, and Cybernetics (SMC), 2011 IEEE International Conference on; Year: 2011; pp. 1037-1043, DO1: 10.1109/ICSMC.2011.6083811.*

Modeling of human driver behavior via receding horizon and artificial neural network controllers; H. Wei; W. Ross; S. Varisco; P. Krief; S. Ferrari; 52nd IEEE Conference on Decision and Control; Year: 2013; pp. 6778-6785, DOI: 10.1109/CDC.2013.6760963.*

* cited by examiner

METHOD AND DEVICE FOR ASSISTING A DRIVER OF A VEHICLE IN A BOTTLENECK

RELATED APPLICATION INFORMATION

The present application claims priority to and the benefit of German patent application no. 10 2013 213 216.6, which was filed in Germany on Jul. 5, 2013, the disclosure of which is incorporated herein by reference.

FIELD OF THE INVENTION

The present invention relates to a method for assisting a driver of a vehicle in a bottleneck, to a corresponding device, as well as to a corresponding computer program product.

BACKGROUND INFORMATION

When a roadway is narrowed by obstacles, a driver of a vehicle may have difficulties safely guiding the vehicle through the resulting bottleneck.

German patent document DE 10 2011 082 475 A1 discusses a driver assistance system for assisting a driver in collision-relevant situations.

SUMMARY OF THE INVENTION

Against this background, a method for assisting a driver of a vehicle in a bottleneck, furthermore a device which uses this method, as well as ultimately a corresponding computer program product according to the independent patent claims are provided by the present invention. Advantageous embodiments result from the particular subclaims and the following description.

A driver of a vehicle may cause a collision with a roadway boundary or another vehicle, for example, as a result of an incorrect steering movement in a bottleneck.

By detecting the steering movement and checking whether the vehicle is anticipated to violate predetermined spatial boundaries as a result of the steering movement, a counter torque, which is opposed to the steering movement, may be applied to the steering in the case of endangerment. The driver may be warned by the counter torque. The steering movement may be corrected by the counter torque. The violation of the boundaries may be avoided as a result of the correction.

With the aid of the approach provided here, the driver may be assisted while driving inside the bottleneck, without being patronized since an intervention only takes place if an imminent collision is recognized. An intervention may also already take place if a predetermined safety distance from an object were to be fallen below as a result of the steering movement.

A method for assisting a driver of a vehicle in a bottleneck is provided, the method including the following steps:

reading in a piece of information about a negotiable corridor in the bottleneck, an instantaneous trajectory of the vehicle in the bottleneck, and a steering torque which is presently applied by the driver to a steering of the vehicle;

evaluating the piece of information about the corridor, the trajectory, and the steering torque by using known dimensions of the vehicle in order to recognize an anticipated violation of the corridor by at least one part of the vehicle; and providing a control signal for a counter torque which acts against the steering torque when the violation is recognized in order to assist the driver with avoiding the violation.

A vehicle may be understood, in particular, to mean a street vehicle. A bottleneck may be a section of a road or a driving lane, this section having a reduced width with respect to a course of the road or a course of the driving lane. Here, a bottleneck may be recognized when the width of the bottleneck is greater than a width of the vehicle. By carrying out the method, the driver of the vehicle may be assisted with the task of driving through a bottleneck. The bottleneck may be defined at least unilaterally by an obstacle from which a safety distance is to be maintained. The bottleneck may be detected with the aid of a detection device. The detection device or a surroundings monitoring device may establish the safety distance from lateral obstacles and define a remaining strip of the road or roadway as the negotiable corridor. An instantaneous trajectory may be a travel trajectory of the vehicle on the road or driving lane on which the vehicle is presently traveling. A steering torque may be a torque which is applied by the driver to the steering of the vehicle. A violation of the corridor may be an anticipated exceedance of the boundaries of the corridor by at least one integral part of the vehicle. In this case, a protruding part of the vehicle such as a side mirror may also cause the violation, for example. A counter torque may be provided in the steering by a motor or an actuator.

In the step of evaluating, a future trajectory of the vehicle may be determined by using the instantaneous trajectory, the steering torque, and the dimensions of the vehicle. The future trajectory may be compared to the corridor in order to recognize the violation. A future trajectory may be estimated. A probability of the future trajectory may be taken into account when evaluating the violation.

The method may include a step of ascertaining a variable and, alternatively or additionally, a direction of the counter torque by using the corridor and the future trajectory. In the step of providing, the control signal may be provided by using the variable and/or the direction. If only a minor intervention is needed to correct the steering torque for the purpose of avoiding the violation, a smaller counter torque may be provided than if a major intervention is needed.

The method may include a step of detecting the piece of information about the corridor, the piece of information being detected by using sensor data of at least one sensor of the vehicle. At least one minimum width of the bottleneck and, alternatively or additionally, a course of the bottleneck is/are detected in the sensor data in order to obtain the piece of information. The corridor may also be directly ascertained. In this way the method may respond particularly rapidly.

In the step of detecting, it is possible to differentiate between static objects and dynamic objects in the area of the bottleneck. A smaller safety distance may be maintained from the static objects than from the dynamic objects for the purpose of defining the corridor. By adapting the safety distances, a potential change in the dynamic objects may be taken into account. For example, another vehicle may narrow the bottleneck even further, while a roadway boundary is immovable. For this reason, it is possible to drive more closely to the roadway boundary than to the other vehicle.

The counter torque may be gradually reduced via the control signal if a correction torque of the driver which is sufficient for avoiding the violation is read in. A gradually changing counter torque may prevent the driver from getting frightened.

The counter torque may be limited to a predefined maximum value via the control signal. As a result of the limitation, the driver may use the steering torque to overcome the counter torque if needed in order to consciously prevent a severe accident by falling below another safety distance.

Furthermore, a device for assisting a driver of a vehicle in a bottleneck is provided, the device including the following features:

- an interface for reading in a piece of information about a negotiable corridor in the bottleneck, an instantaneous trajectory of the vehicle in the bottleneck, and a steering torque which is presently applied by the driver to a steering of the vehicle;
- a device for evaluating which is configured to evaluate the piece of information about the corridor, the trajectory, and the steering torque by using known dimensions of the vehicle in order to recognize an anticipated violation of the corridor by at least one part of the vehicle; and
- a device for providing a control signal for a counter torque which acts against the steering torque when the violation is recognized in order to assist the driver with avoiding the violation.

The device is configured to carry out or implement the steps of one variant of a method provided herein in corresponding devices. This embodiment variant of the present invention in the form of a control unit also makes it possible to achieve the object underlying the present invention rapidly and efficiently.

In the present case, a device may be understood to mean an electrical device which processes sensor signals and outputs control and/or data signals as a function thereof. The device may have an interface which may be configured as hard- and/or software. In the case of a hardware configuration, the interfaces may, for example, be a part of a so-called system ASIC, which includes various functions of the control unit. It is, however, also possible that the interfaces are independent, integrated circuits or are at least partially made of discrete components. In the case of a software configuration, the interfaces may be software modules which are present on a microcontroller in addition to other software modules, for example.

A computer program product having program code is also advantageous, which may be stored on a machine-readable carrier, such as a semiconductor memory, a hard disk memory, or an optical memory, and is used for carrying out the method according to one of the specific embodiments described above, when the program product is executed on a computer or a device.

The present invention is elucidated below in greater detail, as an example, on the basis of the appended drawings.

DETAILED DESCRIPTION

Figure 1:
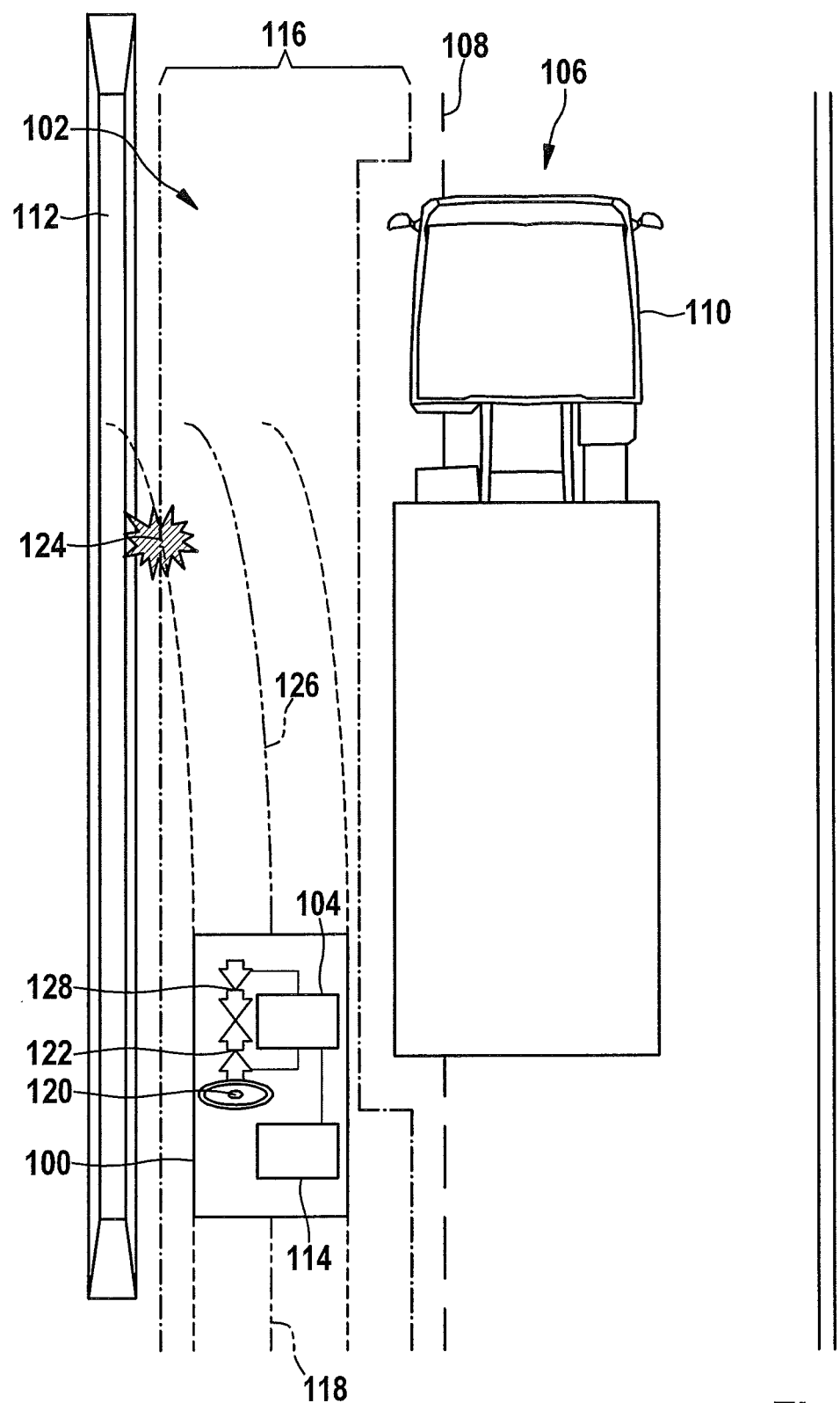
FIG. 1 shows a representation of a vehicle in a bottleneck.

In the following description of exemplary embodiments of the present invention, the elements which are illustrated in the various figures and appear to be similar are identified with identical or similar reference numerals; a repetitive description of these elements is dispensed with.

FIG. 1 shows a representation of a vehicle 100 in a bottleneck 102. Vehicle 100 has a device 104 for assisting a driver of vehicle 100 in bottleneck 102 according to one exemplary embodiment of the present invention. Vehicle 100 is located on a roadway 106 having multiple lanes. The driving lanes of roadway 106 are identified by a roadway marking 108. Vehicle 100 is located on the left-hand driving lane. A truck 110 is located on the right-hand driving lane. Truck 110 is too far left and thus violates the left-hand lane. Truck 110 protrudes into the left-hand lane across roadway marking 108. On the left-hand side, the left-hand lane is delimited by a barrier 112. Bottleneck 102 is located between barrier 112 and truck 110. Bottleneck 102 is wide enough for driving safely through bottleneck 102 with vehicle 100.

Device 104 is configured to read in a piece of information about a negotiable corridor 116 in bottleneck 102 from a surroundings monitoring device 114 of vehicle 100. Corridor 116 is defined by a safety distance from truck 110 and a safety distance from barrier 112. In this case, the safety distance from truck 110 is greater than from barrier 112, since truck 110 is recognized as a moving obstacle. Furthermore, device 104 is configured to read in a piece of information about an instantaneous trajectory 118 of vehicle 100 from surroundings detection/monitoring device 114 or a navigation system of vehicle 100. For this purpose, device 104 reads in a steering torque 122 which is presently applied by the driver to a steering 120 of vehicle 100. Device 104 is configured to evaluate the piece of information about negotiable corridor 116, trajectory 118, and steering torque 122 by using the dimensions of vehicle 100 in order to recognize an anticipated violation 124 of corridor 116 or of safety distances by at least one part of vehicle 100. In this case, an anticipated trajectory 126 of vehicle 100 is ascertained. Violation 124 is recognized when an outer contour of vehicle 100 will violate a boundary of corridor 116. If an anticipated violation 124 is recognized, device 104 makes available a control signal for a counter torque 128 which acts against steering torque 122. Counter torque 128 is used to assist the driver with correcting anticipated trajectory 126 until a violation 124 is no longer recognized.

The approach provided here allows for a rapid compensation for erroneous driver's steering torques 122 in bottlenecks 102.

Within bottlenecks 102, e.g., in the case of construction zone walls 112 or closely moving objects 110, a driver of a vehicle 100 may start to panic. In this case, the driver may react incorrectly and steer in the incorrect direction toward obstacle 110, 112 instead of steering away from obstacle 110, 112, so that an accident may result from the driver's error.

Driver assistance systems such as lane keeping support or a bottleneck assist or construction zone assist may prevent accidents caused by an unintended leaving of a lane or a collision with lateral driving lane boundaries 112 in that steering torque 122 of the electric power steering (EPS) is adapted accordingly.

Here, the position or the yaw rate of vehicle 100 may be adjusted in a lane or a corridor 116.

The response to the erroneous behavior of the driver with the aid of a control loop using the yaw rate or the position is structurally comparably slow, since a yaw rate or an erroneous vehicle position is established only as a result of the driver's erroneous steering. This may not be sufficient in bottlenecks, in particular.

Figure 3:
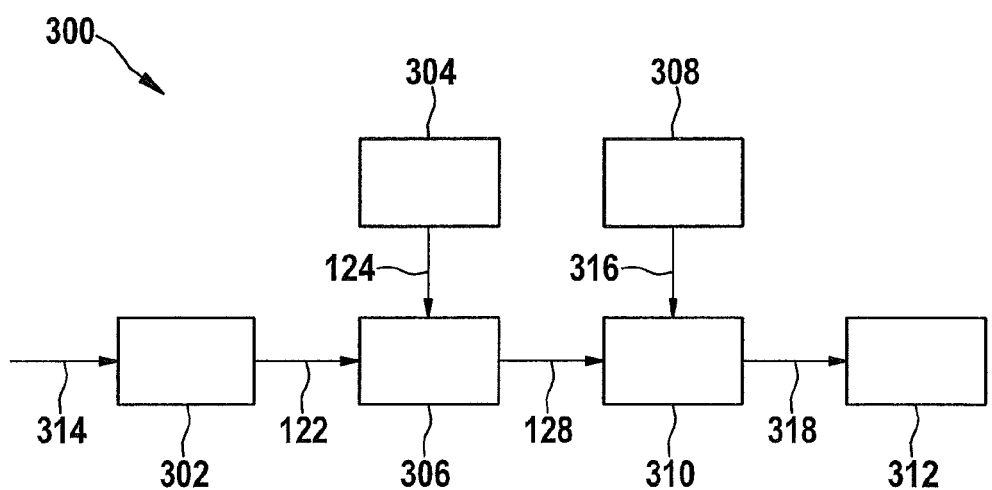
FIG. 3 shows a block diagram of a device for assisting a driver of a vehicle in a bottleneck according to one exemplary embodiment of the present invention.

Erroneous steering behavior of the driver may be readjusted more rapidly when driver steering torque 122 is estimated from the torsion rod torque measured in EPS 120 and is engine-adjusted and provided as opposing steering torque 128 than through the control loop using the yaw rate or the position. This takes place when a sufficiently critical approach 124 to lateral or upcoming objects 110, 112 is recognized by surroundings sensors. One exemplary embodiment of the system structure is illustrated in FIG. 3.

Figure 2:
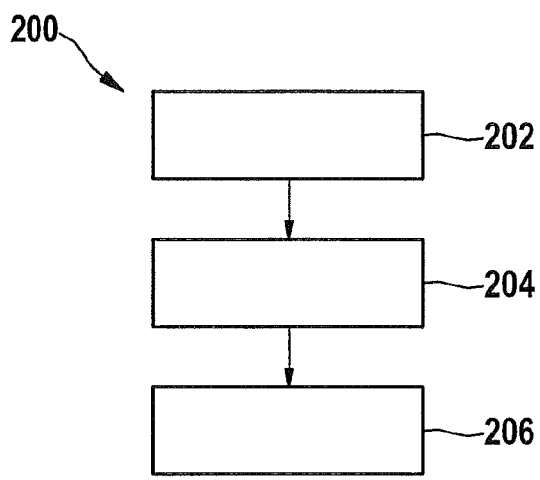
FIG. 2 shows a flow chart of a method for assisting a driver of a vehicle in a bottleneck according to one exemplary embodiment of the present invention.

FIG. 2 shows a flow chart of a method 200 for assisting a driver of a vehicle in a bottleneck according to one exemplary embodiment of the present invention. The method may be carried out on a device such as the one illustrated in FIG. 1, for example. Method 200 has a step 202 of reading in, a step 204 of evaluating, and a step 206 of providing.

In step 202 of reading in, a piece of information about a negotiable corridor in the bottleneck is read in. Furthermore, an instantaneous trajectory of the vehicle in the bottleneck and a steering torque which is presently applied by the driver to a steering of the vehicle is read in step 202. In step 204 of evaluating, the pieces of information about the corridor, the trajectory, and the steering torque are evaluated by using known dimensions of the vehicle in order to recognize an anticipated violation of the corridor by at least one part of the vehicle. In step 206 of providing, a control signal is provided for a counter torque which acts against the steering torque when the violation is recognized in order to assist the driver with avoiding the violation.

In one exemplary embodiment, in step 204 of evaluating, a future trajectory of the vehicle is determined by using the instantaneous trajectory, the steering torque, and the dimensions of the vehicle. The future trajectory is compared to the corridor in order to recognize the violation. The future trajectory represents a travel path through which the vehicle is anticipated to travel if the steering torque remains constant. The future trajectory is estimated for the purpose of being able to anticipate the violation.

In one exemplary embodiment, the method includes a step of ascertaining a variable and, alternatively or additionally, a direction of the counter torque, the variable and, alternatively or additionally, the direction being ascertained by using the corridor and the future trajectory. In the step of providing 206, the control signal is provided by using the variable and, alternatively or additionally, the direction.

In one exemplary embodiment, the method includes a step of detecting the piece of information about the corridor, the pieces of information being detected by using sensor data of at least one sensor of the vehicle. At least one minimum width of the bottleneck and, alternatively or additionally, a course of the bottleneck is/are detected in the sensor data in order to obtain the piece of information.

In one exemplary embodiment, it is differentiated between static objects and dynamic objects in the area of the bottleneck. A smaller safety distance is maintained from the static objects than from the dynamic objects for the purpose of defining the corridor.

In one exemplary embodiment, the counter torque is gradually reduced via the control signal if a correction torque of the driver is read in which is sufficient for avoiding the violation.

In one exemplary embodiment, the counter torque is limited to a predefined maximum value via the control signal.

In other words, FIG. 2 shows a method for preventing dangerous situations.

FIG. 3 shows a block diagram of a device 300 for assisting a driver of a vehicle in a bottleneck according to one exemplary embodiment of the present invention. Device 300 has an estimator 302, a first interface 304, a controller 306, a second interface 308, an adder 310, and a limiter 312. Estimator 302 receives a signal 314 which represents a torque at a torsion rod of the vehicle, or a torsion rod torque, and uses it to estimate a steering torque 122 of the driver or a driver's steering torque 122. For this purpose, estimator 302 uses a model of steering and a Kalman filter. Steering torque 122 is an input variable of controller 306. A critical approach 124 to at least one object is received from a situation recognition as an additional input variable of controller 306 via first interface 304. Controller 306 is configured as a PD controller. As the output variable of controller 306, a counter torque 128 is provided to adder 310, and via second interface 308, a steering signal 316 is received from a driver assistance system, such as a lane keeping support or a construction zone assist. Counter torque 128 and steering signal 316 are added to an absolute steering torque 318 or absolute value in adder 310 and transmitted to limiter 312. In limiter 312, absolute steering torque 318 is limited and transferred to an electrical steering assistance of the vehicle via a gradient for functional safety.

With the aid of the approach provided here, the collision risk in bottlenecks is estimated during the drive in the straight forward driving direction. If the collision risk is recognized as critical on the side in the forward direction of movement of the vehicle (on the left, on the right, or on both sides as seen from the direction of movement of the vehicle) and if the driver steers the steering wheel in the next side of collision in this case, this function is activated.

A PD controller 306 generates a counter torque 128 to the steering wheel, so that incorrect counter torque 122 of the driver is compensated for in this way. Here, a standard PD controller 306 having a parameter for portion P and a parameter for portion D may be used. Instantaneous driver's steering torque 122 at the release point in time and its change with regard to a previous point in time of the control cycle may be rapidly adjusted in this way. If the driver steers in the correct direction with the assistance of the driver assist, so that the collision risk in the bottlenecks no longer exists, counter torque 128 is slowly reset at an applicable ramp by controller 312. Counter torque 128 may be limited to a fixed value, e.g., 3 Nm.

Steering torque 122 which is controlled by the driver in the incorrect direction is compensated for and attenuated in this way. For safety reasons, counter torque 128 may be limited to a fixed value of 3 Nm.

The driver feels counter torque 128 directly on the steering wheel, so that the driver is warned early and noticeably against the next potential collision as a result of his/her incorrect behavior. The driver thus has enough time to correct his/her steering behavior.

This function remains active until the driver steers away from the side of the collision risk or the collision risk no longer exists on the critical side.

Figure 4:
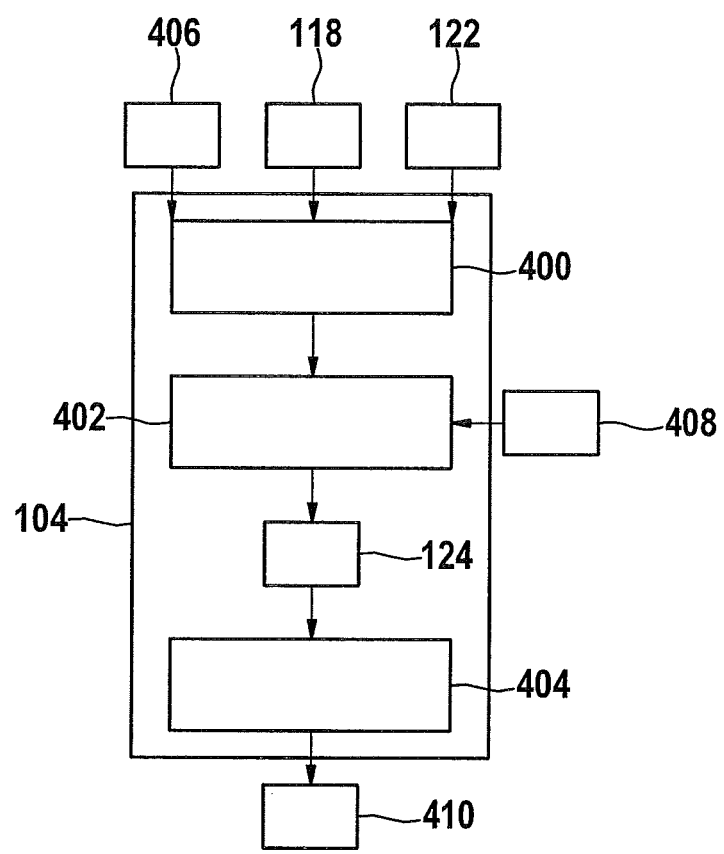
FIG. 4 shows a block diagram of a device for assisting a driver of a vehicle in a bottleneck according to one exemplary embodiment of the present invention.

FIG. 4 shows a block diagram of a device 104 for assisting a driver of a vehicle in a bottleneck according to one exemplary embodiment of the present invention. Device 104 has an interface 400, a device 402 for evaluating, and a device 404 for providing. Device 104 corresponds to the device in FIG. 1. Interface 400 is configured to read in a piece of information 406 about a negotiable corridor in the bottleneck, an instantaneous trajectory 118 of the vehicle in the bottleneck, and a steering torque 122 which is presently applied by the driver to a steering of the vehicle. Device 402 for evaluating is configured to evaluate piece of information 406 about the corridor, trajectory 118, and steering torque 122 by using known dimensions 408 of the vehicle in order to recognize an anticipated violation 124 of the corridor by at least one part of the vehicle. Device 404 for providing is configured to provide a control signal 410 for a counter torque which acts against the steering torque if violation 124 is recognized in order to assist the driver with avoiding violation 124.

The exemplary embodiments described and shown in the figures have only been selected as examples. Different exemplary embodiments may be combined with each other in their entirety or with regard to their individual characteristics. Also, one exemplary embodiment may be supplemented with characteristics of another exemplary embodiment. Furthermore, method steps according to the present invention may be repeated and executed in a sequence different from the one described.

If an exemplary embodiment includes an "and/or" link between a first characteristic and a second characteristic, this should be read in such a way that the exemplary embodiment according to one specific embodiment has both the first characteristic and the second characteristic and according to another specific embodiment it has either only the first characteristic or only the second characteristic.

What is claimed is:

1. A method for assisting a driver of a vehicle in a bottleneck, the method comprising:
    reading in, via an interface, a piece of information, from a surroundings detection/monitoring device of the vehicle, about a negotiable corridor in the bottleneck, an instantaneous trajectory, from the surroundings detection/monitoring device or a navigation system of vehicle, of the vehicle in the bottleneck, and a steering torque which is presently applied by the driver to a steering of the vehicle;
    evaluating, via a processor device of an assisting control system, the piece of information about the corridor, the trajectory, and the steering torque by using known dimensions of the vehicle to recognize an anticipated violation of the corridor by at least one part of the vehicle; and
    providing, via the processor device of the assisting control system, a control signal for a counter torque which acts against the steering torque when the violation is recognized to assist the driver with avoiding the violation.

2. The method of claim 1, wherein in the evaluating, a future trajectory of the vehicle is determined by using the instantaneous trajectory, the steering torque, and the dimensions of the vehicle, and the future trajectory is compared to the corridor to recognize the violation.

3. The method of claim 2, further comprising:
    ascertaining at least one of a variable and a direction of the counter torque by using the corridor and the future trajectory, wherein in the providing, the control signal is provided by using the at least one of the variable and the direction.

4. The method of claim 1, further comprising:
    detecting the piece of information about the corridor by using sensor data of at least one sensor of the vehicle, at least one minimum width of the bottleneck and/or a course of the bottleneck being detected in the sensor data to obtain the piece of information.

5. The method of claim 4, wherein in the detecting, it is differentiated between static objects and dynamic objects in the area of the bottleneck, a smaller safety distance being maintained from the static objects than from the dynamic objects for defining the corridor.

6. The method of claim 1, wherein in the providing, the counter torque is gradually reduced via the control signal if a correction torque of the driver is read in which is sufficient for avoiding the violation.

7. The method of claim 1, wherein in the providing, the counter torque is limited to a predefined maximum value via the control signal.

8. A device for assisting a driver of a vehicle in a bottleneck, comprising:
    an assisting control system, including:
        an interface to read in a piece of information from a surroundings detection/monitoring device of the vehicle about a negotiable corridor in the bottleneck, an instantaneous trajectory, from the surroundings detection/monitoring device or a navigation system of vehicle, of the vehicle in the bottleneck, and a steering torque which is presently applied by the driver to a steering of the vehicle;
        an evaluating device to evaluate the piece of information, from the surroundings monitoring device of the vehicle, about the corridor, the trajectory, and the steering torque by using known dimensions of the vehicle to recognize an anticipated violation of the corridor by at least one part of the vehicle; and
        a device for providing a control signal for a counter torque which acts against the steering torque when the violation is recognized to assist the driver with avoiding the violation.

9. A computer readable medium having a computer program, which is executable by a processor, comprising:
    a program code arrangement having program code for assisting a driver of a vehicle in a bottleneck, by performing the following:
        reading in, via an interface, a piece of information, from a surroundings detection/monitoring device of the vehicle, about a negotiable corridor in the bottleneck, an instantaneous trajectory, from the surroundings detection/monitoring device or a navigation system of vehicle, of the vehicle in the bottleneck, and a steering torque which is presently applied by the driver to a steering of the vehicle;
        evaluating, via a processor device of an assisting control system, the piece of information about the corridor, the trajectory, and the steering torque by using known dimensions of the vehicle to recognize an anticipated violation of the corridor by at least one part of the vehicle; and
        providing, via the processor device of the assisting control system, a control signal for a counter torque which acts against the steering torque when the violation is recognized to assist the driver with avoiding the violation.

* * * * *